US006234317B1

United States Patent
Sommer

(10) Patent No.: US 6,234,317 B1
(45) Date of Patent: May 22, 2001

(54) DEVICE FOR SORTING RAW, PRE-TREATED OR RECYCLED BULK MATERIAL

(76) Inventor: Wolfgang Sommer, Holstanstrasse 61, 25560 Schenefeld (DE)

(*) Notice: Subject to any disclaimer, the term of this patent is extended or adjusted under 35 U.S.C. 154(b) by 0 days.

(21) Appl. No.: 09/292,505

(22) Filed: Apr. 15, 1999

(30) Foreign Application Priority Data

Apr. 15, 1999 (DE) .......................................... 299 06 594 U
Apr. 15, 1999 (DE) .......................................... 299 06 746 U

(51) Int. Cl.[7] .............................. B03B 1/00; F21V 29/00
(52) U.S. Cl. .............................. 209/3; 209/577; 209/938; 362/222; 362/294; 241/15
(58) Field of Search .............................. 209/3, 4, 5, 576, 209/577, 587, 938; 362/208, 247, 222, 294; 241/15, 20

(56) References Cited

U.S. PATENT DOCUMENTS 4,042,819 * 8/1977 Dacal .................................... 362/222
5,090,576 * 2/1992 Menten ................................ 209/587

FOREIGN PATENT DOCUMENTS 295 13 718
  U1   1/1997 (DE).
0 562 506 A2   9/1993 (EP).

* cited by examiner

Primary Examiner—Tuan N. Nguyen
(74) Attorney, Agent, or Firm—Pendorf & Cutliff

(57) ABSTRACT

A device for sorting raw, pre-treated or recycled bulk materials, which are comprised of individual components to be sorted, wherein the classification of the parts to be sorted occurs along empirically determined classification parameters and the material which is sorted is removed, the device including a conveyance device for supplying the bulk material, a conditioning device for wetting the bulk material, a break-down device for breaking down the bulk material into individual parts to be sorted, a sensor device for sensing the classification-relevant characteristics of the components to be sorted and for production of measurement data, which includes at least one camera, which is connected to a device for evaluation of electronically measured values with at least one micro computer for classification of the components to be sorted and for achievement of a control signal by means of a control unit, wherein the camera is associated with at least one even diffused light emitting light source. The device includes means for cleaning the light source.

21 Claims, 6 Drawing Sheets

DEVICE FOR SORTING RAW, PRE-TREATED OR RECYCLED BULK MATERIAL

BACKGROUND OF THE INVENTION

1. Field of the Invention

The invention concerns a device for sorting raw, pre-treated or recycled bulk materials, which are comprised of individual components to be sorted, wherein the classification of the parts to be sorted occurs along empirically determined classification parameters and the material which is sorted is removed, the device having a conveyance device for supplying the bulk material, a conditioning device for wetting the bulk material, a break-down device for breaking down the bulk material into individual parts to be sorted, a sensor device for sensing the classification-relevant characteristics of the components to be sorted and for production of measurement data, which includes at least one camera, which is connected to a device for evaluation of electronically measured values with at least one micro computer for classification of the components to be sorted and for achievement of a control signal by means of a control unit, wherein the camera is associated with at least one even diffused light emitting light source.

2. Description of the Related Art

A device for sorting bulk materials is known from EP 0 562 506 A2. This includes an optical sensor head, which is associated with an illumination device with white light. The signals obtained by the sensor head during passage-by of individual glass fragments are transmitted to a computer and a control unit, which controls a compressed air jet. A stream of compressed air can remove an undesired glass fragment. This known device has the disadvantage, that the glasses to be sorted must be individualized and the recognition of materials to be selected for removal is only imprecisely possible. The sorting thus occurs rather slowly and imprecisely.

From DE 295 13 718 U it is also known, to select as the light source one which emits an even diffuse light, wherein also multiple light sources can be employed. Thereby the individual bulk materials are illuminated without shadows, so that they can be sensed by the at least one camera without interference. In the case of, for example, mineral bulk materials, including those which are abrasive, there is the disadvantage, that by the development of dust the light sources are soiled, so that the illumination of the bulk material required for the camera or, as the case may be, cameras, is diminished, which can result in erroneous measurement.

With the known devices there is further the problem, for objects which are smaller than 5 mm, of a poor reliability of illumination which is related to varying conveyance speeds. A mistake at the beginning of the slide, via which the bulk material is supplied to the sensor device, is amplified as the height of falling is increased. Due to the normally large fractions the geometric dimensions of the sensor device and device for compressed air jets cannot be easily reduced to a size as small as desired, it has been attempted to harmonize the speed of the objects. Attempts with a slitted rubber curtain in the area of the discharge edge on which the downwardly directed slide is provided resulted in no satisfactory results. It has thus also been proposed, to provide at the inlet of the slide a cell wheel or gate wheel which can be constructed for example as a bristle roller. With small object this does not however produce the desired degree of control.

The task of the invention is concerned with improving the device of the above described type in such a manner that as well with bulk materials as with small objects a good degree of positive feed control is achieved with appropriately matched or harmonized fall rates of the objects and that a soiling of the light sources is prevented or, as the case may be, can be eliminated in a simple manner, without requiring a lengthy interruption of the operation of the device.

The solution of the problem is inventively solved in accordance with the present invention as discussed below.

The sorting of raw, pre-treated or recycled bulk material with the inventive device is based upon an opto-electronic recognition system. This system analyzes and evaluates these objects. The results are then transmitted to a control electronic. This control electronic controls individual components of the modularly designed separation device, in order to deflect the individual objects from the bulk material stream. The bulk material stream is delivered by a conveyor to the device and fed to a unit for breaking down and individualizing. From this breaking down and individualizing unit the bulk material stream is conveyed in a direction of the separation device, wherein the bulk material items can be conveyed in troughs, grooves, ridges, tracks, or chaotically. The bulk material stream is brought into a free fall. As soon as the free fall occurs, the bulk material stream is scanned with the aid of a cell and/or matrix camera. Each object is then evaluated by the evaluation electronic and removed from the separation device or as the case may be from the bulk material stream. Thereby a separation of the objects of the bulk material into a reject path and an approved path is possible. The evaluation electronic can be provided on the basis of a micro computer and/or by DSP, RISC, CISC and makes possible hierarchical and/or parallel data processing.

The evaluation of the individual objects of the bulk material stream results from the detection of the lightness of the material surface via the reflection behavior or response. In transparent materials occlusions can be detected. It is possible to detect the shape of the objects of the bulk material. Thereby the center of gravity of the individual objects can be determined, which facilitates the appropriate controlling of the components of the separation device for the separating out of objects to be sorted out. A determination of size can also be undertaken by a conditioning device, which is to be provided prior to the break-down and individualizing device. By means of an appropriate CCD-sensor of the cell and/or matrix camera it is also possible to have a pixel-individual evaluation, whereby the recognition of the color texture of the object of the bulk material can be improved. The color recognition can be black and white or be accomplished in 256 steps of grayness by utilization of a black/white camera system. With such a camera system semi-real colors can also be determined by the employment of filters. With utilization of a color camera system real colors will be detected. It is also possible to increase the throughput of the bulk material stream thereby, that multiple observation planes are provided sequentially.

BRIEF DESCRIPTION OF THE DRAWINGS

The invention will be described in greater detail in the following on the basis of the embodiment of the inventive device shown schematically in the figures. There are shown FIG. 1 the breaking down unit of the device in a schematic perspective representation FIG. 2 the arrangement of the illumination unit for a device of this species in a side view FIG. 3 a illumination unit according to FIG. 1 in a perspective view FIG. 4 the illumination unit according to FIG. 2 in a broken down perspective view FIGS. 5 and 6 light bodies of the illumination unit according to FIG. 2 in various views

DETAILED DESCRIPTION OF THE INVENTION

Figure 1:
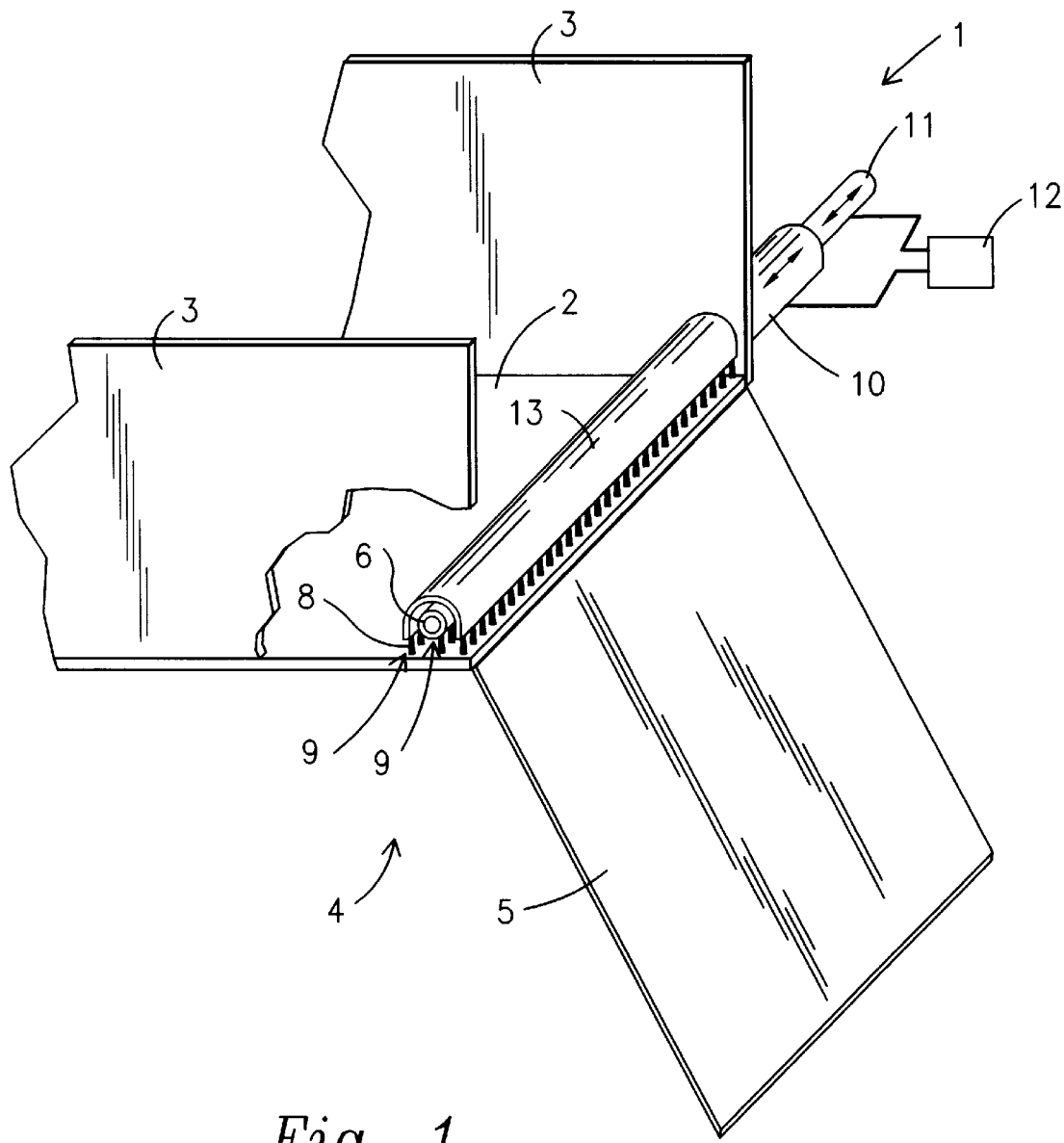

FIG. 1 shows an end segment 4 of the bulk material supply conveyor 2 of the not in greater detail shown device for sorting of bulk material, to which is coupled a downwardly directed slide 5. Between the side walls 3 of the bulk material supply conveyor 2 there is provided prior to the slide 5 a breaking-down and individualizing unit 1.

The breaking down and individualizing unit 1 includes a generally semi-circular housing 13, which is open towards the bottom and which has brushes 6, 7 situated therein, of which the brush 7 is provided inside brush 6. The brushes 6, 7 are slidable coaxially with respect to each other. For this each brush 6, 7 is connect with a pendulum stroke drive 10 or, as the case may be, 11 which is provided outside of a side wall here designated 3. The pendulum stroke drives 10, 11 are connected with a schematically indicated frequency converter 12, with which the axial speed of the brushes 6, 7 can be adjusted, which operate counter-rotatingly to each other. The bristle tufts 8, 9 of the brushes 6, 7 are guided up to the bulk material conveyor to and arranged side by side with separation. Thereby the separation of the bristle tufts 8 or, as the case may be, 9 of the brushes 6 or, as the case may be, 7 respectively be covered by the bristle tufts 9 or, as the case may be, 8 of the other brush 7 or, as the case may be, 6. The granular-like bulk materials on the bulk material conveyor 2 are brought to a common speed in the breakdown device 1 by the brushes 6, 7. After standardization of the speed the bulk materials are again released by appropriate coaxial displacement of the brushes 6, 7 and land on the slide 5. With the described breakdown device 1, in an advantageous manner the observation- and separation area for small objects is kept very small, so that a harmonization of speed of the objects in the area of the device for pressurized air jets is achieved.

Figure 2:
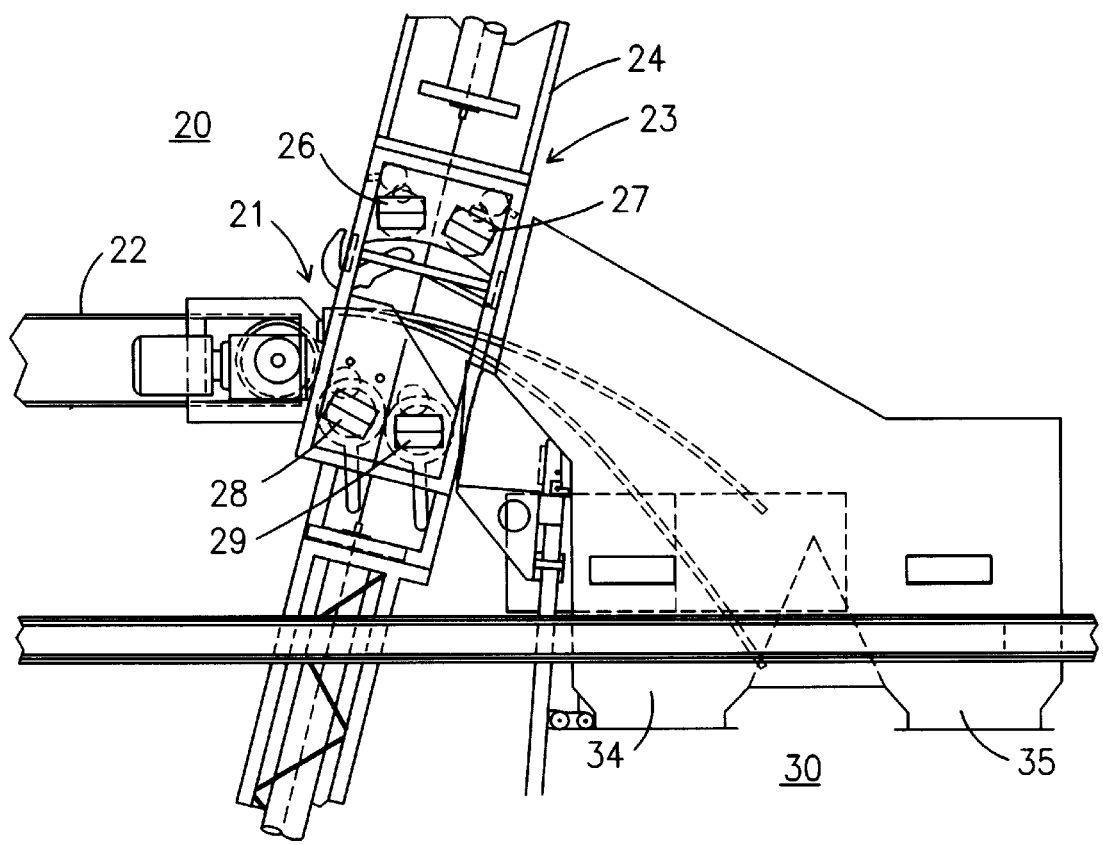

FIG. 2 shows a section of a device 20 for sorting of bulk materials in a side view. The bulk materials to be sorted are provided upon a material transport device 22, of which the end section 21 situated in the conveyance direction is formed as a release or a launching edge for the bulk materials. The end section 21 is provided with an illumination unit 23, which includes a frame 24, in which a diffused light is produced by light sources 26, 27, 28, 29, through which the bulk materials are directed in free-fall. The bulk material stream is optically sensed by at least one cell camera or matrix camera not shown in greater detail, which is operationally connected with a likewise not in greater detail shown bulk material selection unit.

The bulk materials are sorted in accordance with predetermined criteria by the bulk material selection unit and end up respectively in a funnel 34, 35 of a material reception device 30, from they are introduced into collection containers not shown in greater detail or put on a bottom conveyor.

Figure 3:
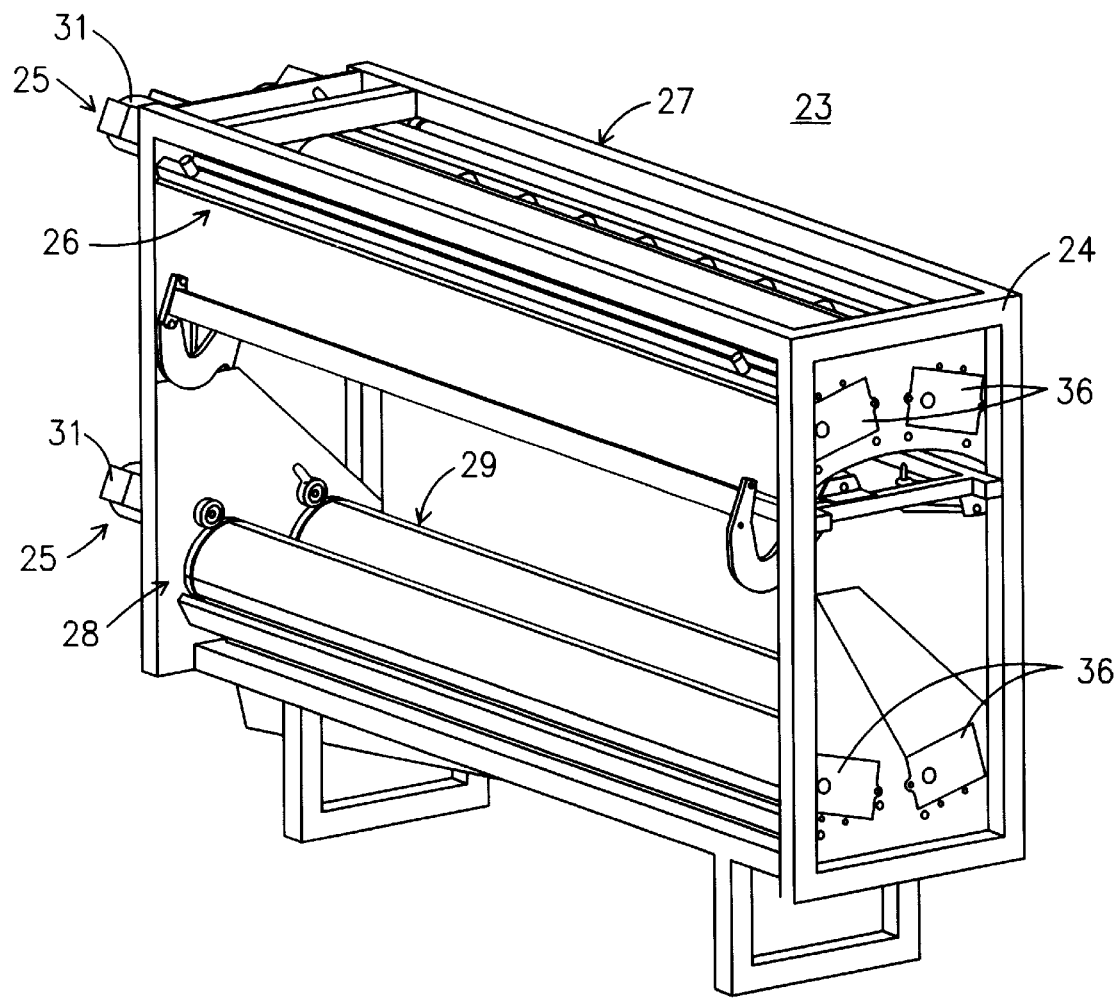
Figure 4:
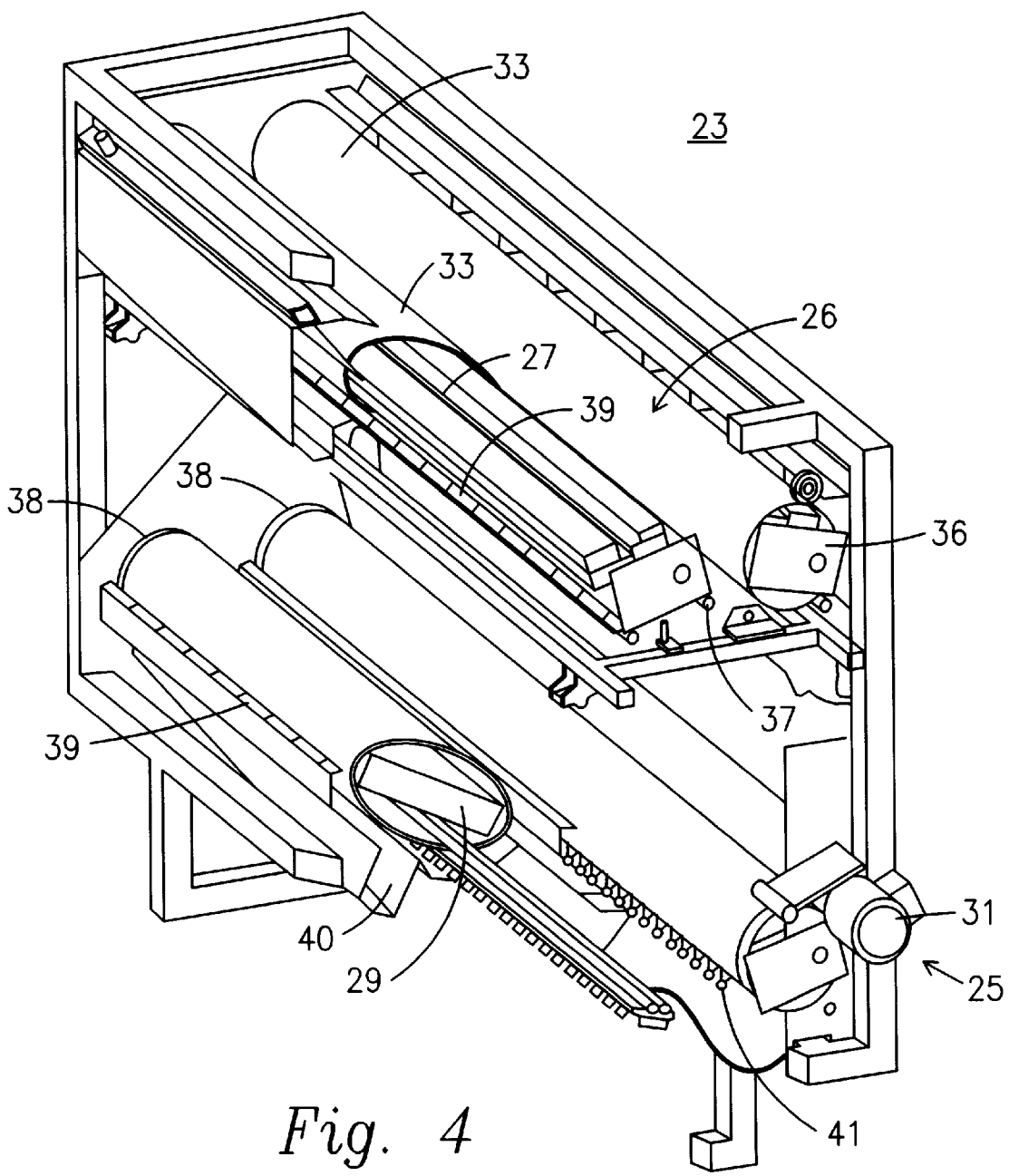
Figure 5:
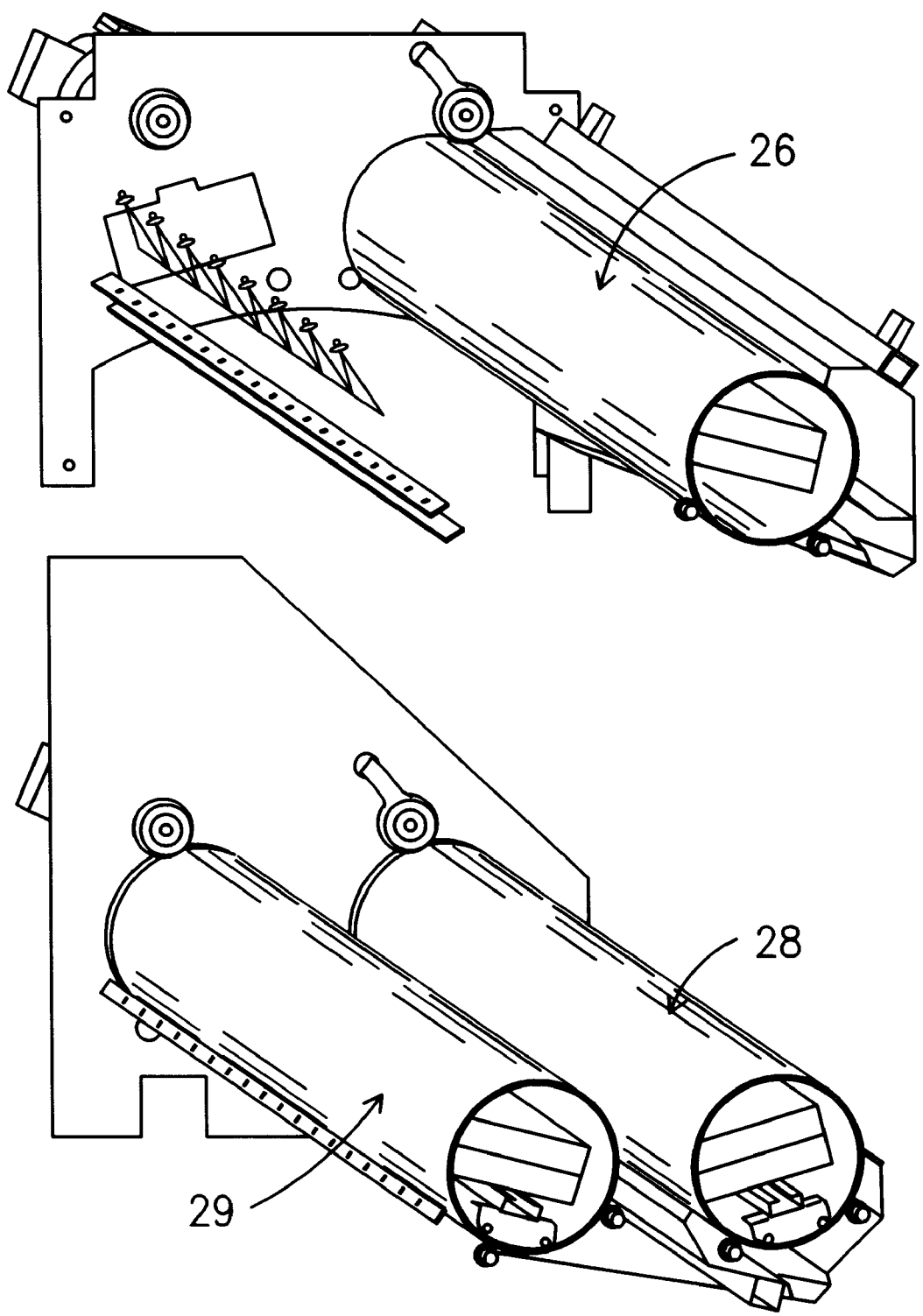
Figure 6:
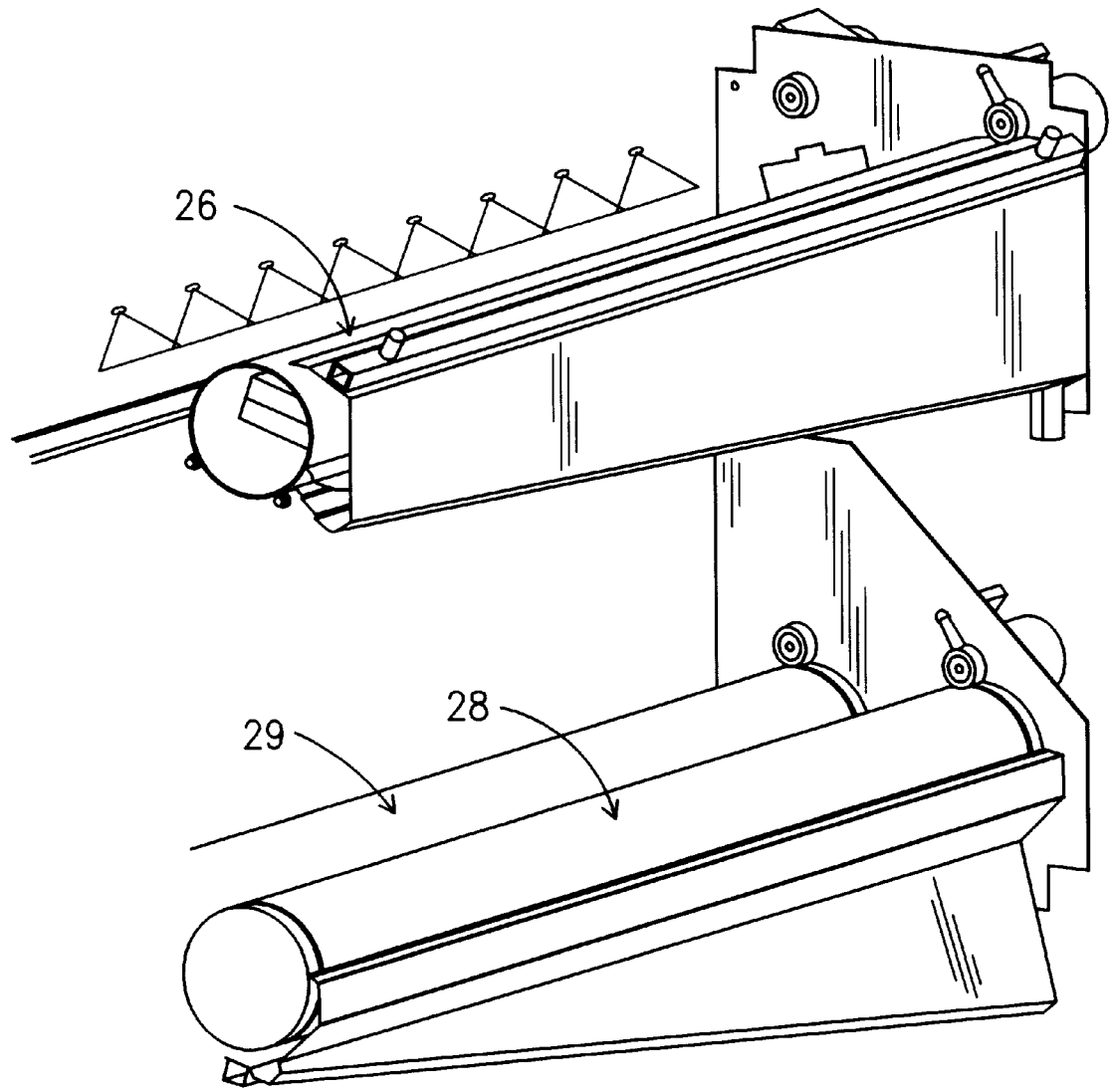

In FIGS. 3 and 4 the illumination unit 23 is shown in greater detail. Each light source 26, 27, 28, 29 is mounted within a light transmissive generally cylindrical body 33, of which the outer upper surface can be acted on by compressed air and/or pressurized water. It is also possible, alternatively, to bring the cylindrical bodies 33 in operational engagement with a brush which is not shown in greater detail. On the one end section of each of the bodies 33 is formed a service lid 36, which can be removed from the respective body 33 for an exchange of the respective light sources. The bodies 33 are mounted rotatably upon curve rollers 37 and connected with a drive unit 25. The drive unit 25 can be an electrical drive motor, which has a friction wheel, which respectively is in engagement with two cylindrical bodies 33. For this there is provided for the upper rotatable body 33 of the light sources 26, 27 and the lower rotatable body 33 of the light sources 28, 29 respectively one drive unit 25 (FIG. 3).

Centrifugal or spin-dryer rings 38 are provided on the end section of the body 33 opposite to the service lid 36, via which a sideways running-off of water is prevented. In the outer jacket of each body 33 there is provided at least one lip 39 extending along the length thereof, made of an elastic material, as water shield. The lips 39 can be made of rubber or plastic. In the example shown in FIG. 4 the upper bodies 33 respectively are provided with a lip 39 and the lower bodies 33 respectively with two lips 39. A water tank 40 is provided on the lower bodies 33, which serves as capturing tank and run off. Cleaning jets 41 are provided on the water tank 40, where which the upper surfaces of the lower and upper bodies 33 can be sprayed with water for outer service cleaning.

It is also possible to cover each jacket of each cylindrical body 33 with an air-permeable foil. The foil can be removed entirely or section-wise from the associated cylindrical body 33. It is also possible to so design the foil or film, so that after removal from the body 33 and after accomplishment of cleaning it can again be bonded to the body 33. For protecting against a build-up of dust it is advantageous to construct the foil of an antistatic material. For the cleaning of dust from the foil a brush can be provided in the illumination device 23.

What is claimed is:

1. A device for sorting of raw, pre-treated or recycled bulk material, having individual components to be sorted, wherein the classification of the components to be sorted occurs according to empirical determined classification parameters, and the bulk material to be sorted out is diverted, comprising, in combination:

a bulk material conveyor for supplying the bulk material;

a conditioning unit for wetting the bulk material;

a breakdown unit for breaking down the bulk material into individual components to be sorted;

a sensor device for detection of the characteristics relevant for the classification of the components to be sorted and for production of measurement data;

at least one camera, which is included with the sensor device;

an evaluation device connected to the camera for evaluating electronic measurements having at least one microprocessor or microcomputer for classification of the components to be sorted and for production of control signals by means of a control unit;

an even diffused light emitting light source, which is associated with the camera;

a pair of brushes situated within a housing, the brushes provided coaxially to each other and extending over the breadth of the housing, said housing open towards the bottom;

a drive unit to coaxially displace the brushes relative to each other;

a pair of bristle tufts provided within the brushes and arranged side-by-side with sideways separation with respect to the bulk material conveyor; and at least one light transmissive generally cylindrical body in which a light source is mounted, driven by at least one of compressed air and pressurized water.

2. A device according to claim 1, wherein the drive unit is comprised of two counter running pendulum stroke drives, which are respectively connected with one of the brushes.

3. A device according to claim 2, wherein the pendulum stroke drive is connected with a frequency converter.

4. A device according to claim 1, wherein at least one end section of the cylindrical body includes a service lid.

5. A device according to claim 1, wherein the cylindrical body is rotatably mounted and connected with the drive unit.

6. A device according to claim 5, wherein the cylindrical body is rotatably mounted on curved rollers.

7. A device according to claim 5, wherein the drive unit is formed as an electrical drive motor.

8. A device according to claim 7, wherein the drive motor is connected to a friction wheel.

9. A device according to claim 7, wherein the drive motor is provided on a rotating shaft or a rocker arm.

10. A device according to claim 7, wherein the cylindrical body of the upper light sources and the cylindrical body of the lower light sources are respectively associated with a drive motor.

11. A device according to claim 4, wherein centrifugal or spin-dry rings are formed on the end section of the bodies opposite to the service lids.

12. A device according to claim 1, wherein, on an outer jacket of the cylindrical body and extending along the length thereof at least one lip (39) of an elastic material is provided as water deflector.

13. Device according to claim 12, wherein the lips are made of rubber or plastic.

14. A device according to claim 1, wherein, the cylindrical body of the lower light sources is provided with a water tank (40) having a plurality of cleaning jets.

15. A device according to claim 14, wherein the at least one water tank is formed as a capturing tank and drain.

16. A device according to claim 14, wherein on each water tank elastic lips of rubber or plastic are formed, which respectively lie against one cylindrical body.

17. A device according to claim 1, wherein, each cylindrical body is covered with a light transmissive foil or film.

18. Device according to claim 17, wherein the foil or film is entirely or sectionally removable from the respective cylindrical body.

19. Device according to claim 18, wherein the foils or films removed from the body after cleaning can again be connected with the bodies.

20. Device according to claim 17, wherein the foil or film is formed of an antistatic material.

21. A device according to claim 1, wherein the separation of the two bristle tufts of one of said brushes corresponds approximately to the diameter of bristle tuft of the other brush.

* * * * *